(12) United States Patent
Harris et al.

(10) Patent No.: US 7,937,946 B1
(45) Date of Patent: May 10, 2011

(54) SMALL GAS TURBINE ENGINE WITH LUBRICATED BEARINGS

(75) Inventors: Mark M Harris, Palm Beach Gardens, FL (US); Joseph D Brostmeyer, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 1067 days.

(21) Appl. No.: 11/642,257

(22) Filed: Dec. 20, 2006

Related U.S. Application Data

(60) Provisional application No. 60/753,321, filed on Dec. 21, 2005.

(51) Int. Cl.
*F02C 7/00* (2006.01)

(52) U.S. Cl. .......................................... 60/772; 60/39.08

(58) Field of Classification Search .................. 60/39.01, 60/39.08, 772, 226.1, 782, 785, 804, 745; 415/180, 101–103
See application file for complete search history.

(56) References Cited

U.S. PATENT DOCUMENTS

| | | | |
|---|---|---|---|
| 2,709,567 A * | 5/1955 | Wood ........................... | 415/115 |
| 3,077,075 A | 2/1963 | Turanciol | |
| 3,124,933 A | 3/1964 | Strams, Jr. et al. | |
| 3,932,988 A | 1/1976 | Beaufrere | |
| 4,040,251 A | 8/1977 | Heitmann et al. | |
| 4,086,760 A | 5/1978 | Chute | |
| 4,188,780 A | 2/1980 | Penny | |
| 4,598,544 A | 7/1986 | Williams et al. | |
| 5,042,256 A | 8/1991 | Smith | |
| 5,526,640 A | 6/1996 | Brooks et al. | |
| 6,161,768 A * | 12/2000 | Gordon et al. ............... | 237/12.1 |
| 6,450,758 B1 * | 9/2002 | Schmidt ........................ | 415/115 |
| 6,925,812 B2 | 8/2005 | Condevaux et al. | |
| 6,926,490 B2 * | 8/2005 | McAuliffe et al. ............... | 415/1 |
| 6,983,606 B2 | 1/2006 | Brown | |
| 7,036,321 B2 | 5/2006 | Dudebout et al. | |
| 7,493,769 B2 * | 2/2009 | Jangili ............................ | 60/772 |

* cited by examiner

*Primary Examiner* — Michael Cuff
*Assistant Examiner* — Vikansha S Dwivedi
(74) *Attorney, Agent, or Firm* — John Ryznic

(57) ABSTRACT

A small gas turbine engine with a bearing cooling and lubricating passage arrangement for a high speed rotor shaft. The engine includes a bypass fan and a compressor. The rotor shaft includes a central passage extending through the entire shaft, and where the rotor shaft is supported by a forward bearing and a rearward bearing. Cooling air for the bearings is diverted from the bypass air and is channeled through the bearings. Fuel is added to the cooling air at a location upstream of the bearing to provide lubrication. The cooling air and lubricating fuel passes through the bearings and into the rotating central shaft, and is then forced to flow toward a radial passage located adjacent to the combustor. The fuel is collected on the central shaft surface and forced out the radial passage and into the combustor. The cooling air continuous out from the central shaft to be mixed with the engine exhaust.

6 Claims, 5 Drawing Sheets

SMALL GAS TURBINE ENGINE WITH LUBRICATED BEARINGS

CROSS-REFERENCE TO RELATED APPLICATIONS

This application claims the benefit to an earlier filed Provisional application 60/753,321 filed on Dec. 21, 2005 and entitled SMALL GAS TURBINE ENGINE WITH LUBRICATED BEARINGS.

BACKGROUND OF THE INVENTION

1. Field of the Invention

The present invention relates to a small or micro gas turbine engine, and more specifically to a fuel and air delivery structure that also is used to cool and lubricate the bearings.

2. Description of the Related Art Including Information Disclosed Under 37 CFR 1.97 and 1.98

Small or micro gas turbine engines are used for powering small unmanned air vehicles such as drones and missiles. In the early stages of development, larger gas turbine engines where simply scaled down to the required small size that would fit within the very limited space in these UAVs, or unmanned air vehicles. However, gas turbine engines are not readily scaled down in an effective cost proportional basis and a thrust proportional basis. As the gas turbine engine is reduced in size, the smaller sized rotors must operate at higher rotational speeds in order to achieve adequate performance levels. To take a regular gas turbine engine used in a typical modern jet would require the turbine parts to be reduced in size while operating the rotor shaft at much higher rotational speeds. At these high rotational speeds, the original designed parts such as the rotor shaft and the bearings would not be able to withstand the higher speeds. Rotor dynamics would cause the original design rotor shaft to vibrate so much that the shaft would explode. Also, the bearings would operate at speeds above the design speed. The bearings would burn up or vibrate so much that they would explode as well. Thus, it is an entirely new design challenge to take a regular gas turbine engine and scale it down to the size that would operate effectively in a small gas turbine engine powered vehicle.

The prior art gas turbine engine of Brooks et al, U.S. Pat. No. 5,526,640 issued on Jun. 18, 1996 discloses a small gas turbine engine with a rotor supported by bearings, and in which air and fuel is mixed and then passed through the bearings in order to cool the bearings prior to being burned in the combustor. A fuel slinger propels the air/fuel mixture into the combustor. A separate pump is used to enhance the slinger delivery of the fuel.

U.S. Pat. No. 6,925,812 B2 issued to Condevaux et al on Aug. 9, 2005 entitled ROTARY INJECTOR discloses a turbine engine with a rotary injector supported by ball bearings, and which in the FIG. 14b embodiment (of this patent) discloses that the forward and rearward roller bearings are respectively cooled by spraying pressurized liquid fuel in the first and second cylindrical grooves from respective orifices in a sleeve surrounding the central shaft between the pair of roller bearings (see column 7, lines 9-25).

U.S. Pat. No. 3,932,988 issued to Beaufrere on Jan. 20, 1976 entitled FUEL SLINGER COMBUSTOR discloses a fuel slinger combustor used in a gas turbine engine in which helical grooves are oriented on a rotary shaft to move fuel from grooves inwardly to grooves as the shaft rotates during operation of the engine and the fuel so moved is supplied via grooves to the radial bores of the slinger injector.

There is a need in the prior art for a small gas turbine engine with improved fuel efficiency in order to increase the hover time of the UAV. There is also a need in the prior art to decrease the overall size of the engine in order that the engine can be fitted in a small space. There is also a need in the prior art to reduce the cost of the small gas turbine engine without reducing the performance.

It is an object of the present invention to provide for a small gas turbine engine with bearings capable of being cooled such that a small engine is capable of operating at the required high speeds.

It is another object of the present invention to provide for a small gas turbine engine with lubricated bearings that is more efficient than the prior art engines.

BRIEF SUMMARY OF THE INVENTION

The present invention is a small gas turbine engine that includes a rotor supported by bearings, and a fuel delivery system that delivers fuel in a passage that passes through the bearings in order to cool and to lubricate the bearings. During times of low fuel consumption by the combustor, a fuel regulating valve is used to increase fuel flow through the bearings in order to provide adequate lubrication. The fuel to lubricate the bearings is channeled through a hollow rotor shaft, and in some embodiments is then discharged through a slinger in the shaft into the combustor.

DETAILED DESCRIPTION OF THE INVENTION

Figure 1:
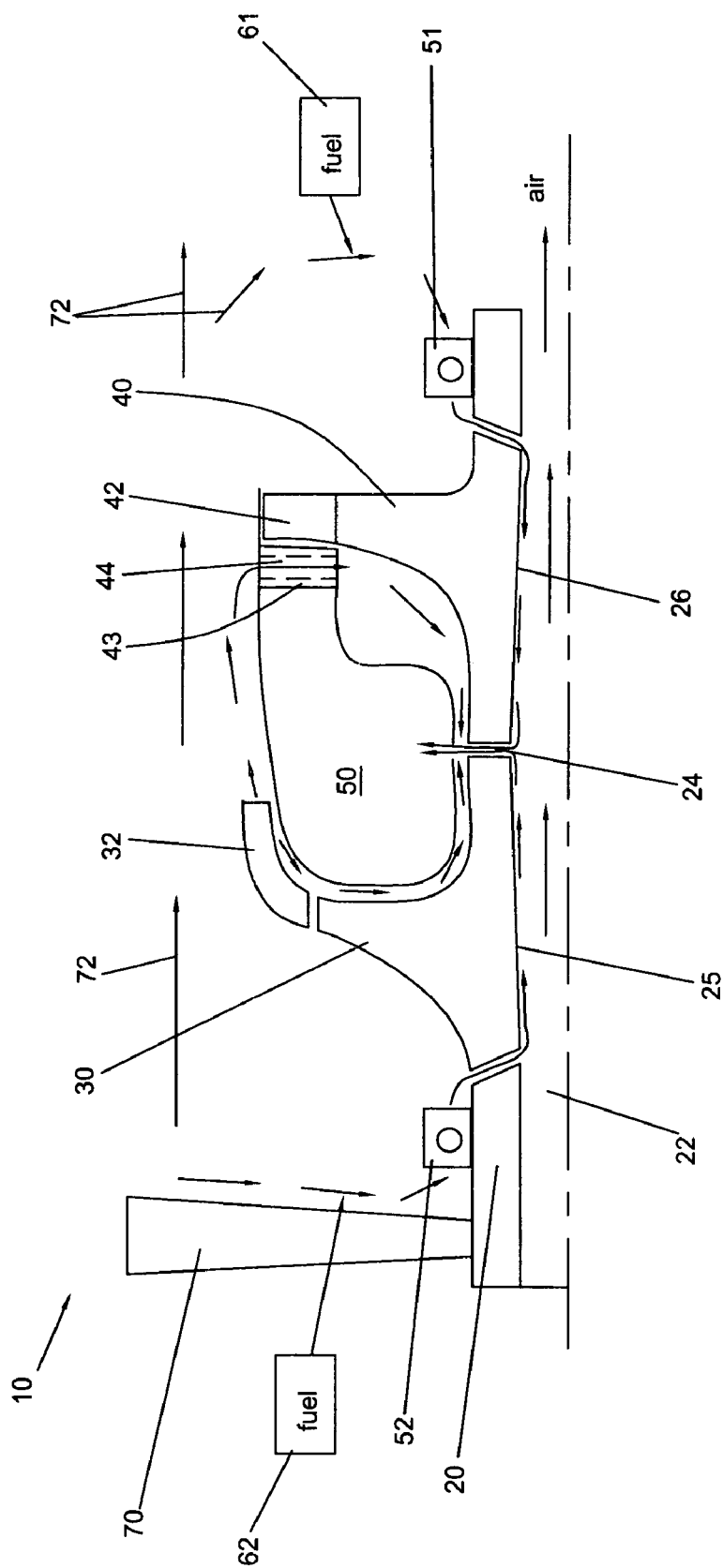
FIG. 1 shows a cross section view of a gas turbine engine having bearings lubricated by fuel that is directed into the hollow shaft before discharging into the combustor through a slinger.

A small gas turbine engine 10 is shown in FIG. 1 and includes a rotor shaft 20 with a hollow passage 22 through the shaft, the rotor shaft being supported for rotation by a front bearing 52 and a rear bearing 51, the rotor 20 having a centrifugal compressor 30 for discharging compressed air into a diffuser 32. The rotor shaft 20 also having a turbine 40 with a turbine blade 42 to produce rotation from impact of a hot gas stream from a combustor 50. A guide vane 43 directs the hot gas stream from the combustor 50 into the turbine blade 42 for improved efficiency. The guide vane 43 includes a cooling air passage 44 to provide cooling for the guide vane 43. A fuel supply means 61 and 62 is used to deliver fuel to the compressed air that leads into the combustor 50. A fan 70 is connected to a front end of the rotor shaft 22 and produces a bypass fan flow 72 that flows around the engine for propulsion of an aircraft, and in which some of the bypass air 72 is used as bearing cooling air.

The gas turbine engine 10 of the present invention operates as follows. The compressor 30 delivers compressed air into the diffuser 32. From the diffuser 32, the compressed air branches off into one of three paths. A first path passes over a front portion of the combustor 50 and enters the combustor from the inside at a point about midway through the combustor 50. A second path passes compressed air from the diffuser 32 over a rear portion of the combustor 50, passing through the cooling passage 44 in the guide vane 43 and into the combustor at the midpoint in which the compressed air from the first path enters the combustor 50. A third path for compressed air is from the fan 70 that produces bypass flow 72 around the engine core (compressor, combustor and turbine) that produces propulsion for an aircraft. Some of the bypass flow 72 is diverted to flow through the forward bearing 52 for the third path of compressed air. A fourth path for compressed air is diverting some of the bypass flow 72 in the aft end to flow through the aft bearing 51. Fuel supply means 61 and 62 injects fuel into the third and fourth compressed air flows before the compressed air flows through the two bearings 51 and 52.

Compressed air from the diffuser and fuel from the fuel supply means 51 and 52 passes through the front and rear bearings 52 and 51, and is then directed through passage in the rotor shaft 20 into the central passage 22 toward a slinger passage 24 located in the rotor shaft 20. An inner surface 25 of the hollow passage 22 is slanted toward the slinger passage 24 in order to promote the formation of liquid fuel on the inner surface 25 of the central passage 22 such that the fuel will pass into the slinger passage 24. The high speed rotation of the rotor shaft 20 will sling the fuel through the slinger passage 24 at a high pressure and sling the fuel into the combustor 50 at the opening therein. The air and fuel through the bearings and central passage is due to the compressed air exiting the diffuser 32. A high pressure differential is established between the diffuser 32 output and the central passage 22 in the rotor shaft 20. This pressure differential forces the compressed air and the fuel through the bearings and the passages through the shaft 20. The rotation of the shaft 20—along with the slanted surfaces 25 along the shaft 20—promotes the flow of liquid fuel toward the slinger passage 24. The compressed air that passes into the central passage 22 with the fuel is directed out the rear of the central passage 22 to be discharged with the exhaust gas from the turbine 40. The fuel delivery means 61 and 62 can be a restrictor, a variable flow valve device, or a pulse width modulated valve connected to a source of fuel such as the fuel tank of the vehicle.

Figure 2:
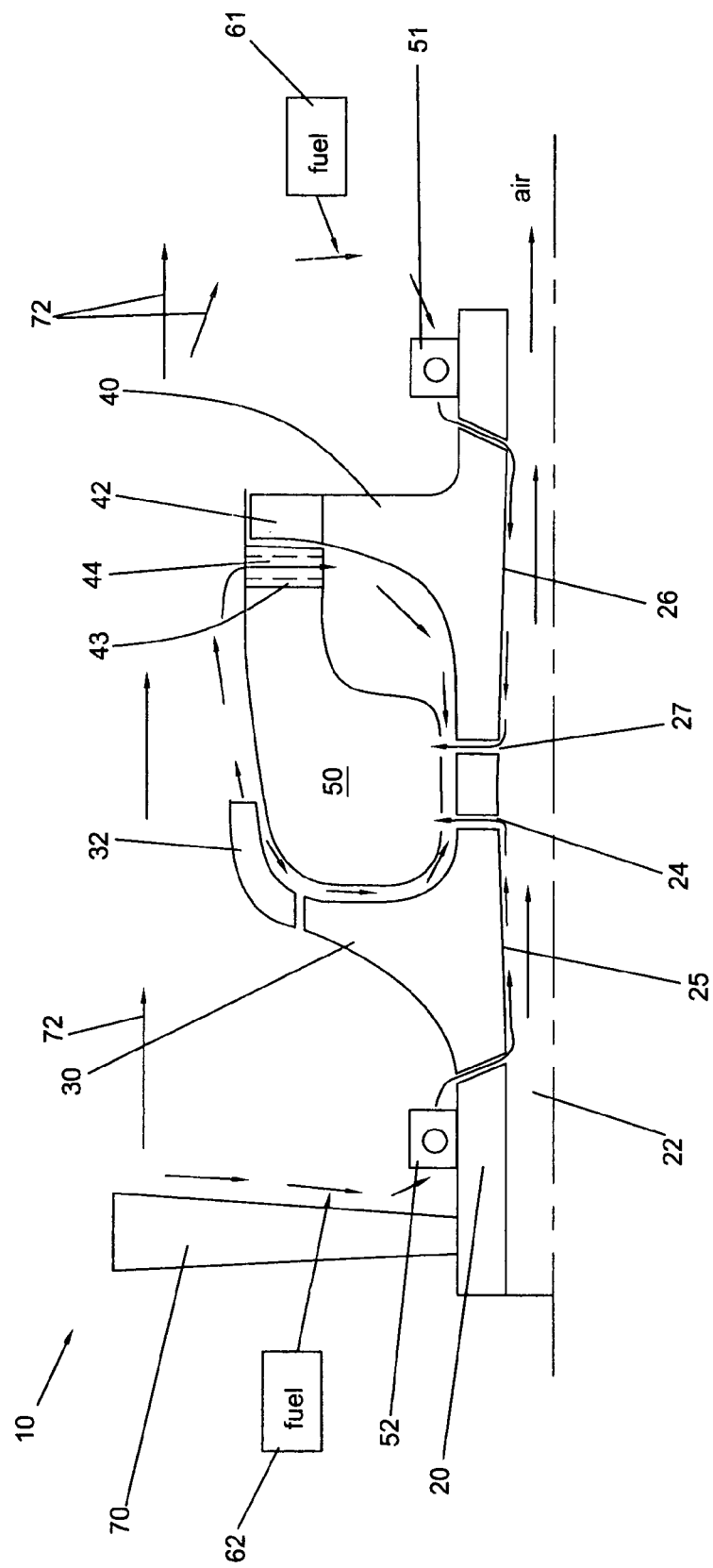
FIG. 2 shows a cross section view of a gas turbine engine of FIG. 1 in which a dual burn zone is supplied with fuel from dual slingers located in the rotor shaft.

Another embodiment of the present invention is shown in FIG. 2. The FIG. 2 embodiment takes the FIG. 1 embodiment and includes an additional fuel slinger passage in the rotor shaft 20. The combustor 50 of this embodiment includes a primary combustion chamber located upstream in the combustor, and a secondary combustion chamber located downstream in the combustor 50. A forward slinger passage 24 slings fuel into the upstream or primary combustion chamber, and a rearward slinger passage 27 slings fuel into the downstream or secondary combustor chamber. The compressed air from the diffuser 32 and compressed air a fuel supply means passes through the bearings 51 and 52 and into the central passage 22 as in the first embodiment of FIG. 1. slanted surfaces 25 on the inside of the central passage 22 promotes buildup of fuel on the inner surface 25, and directs the fuel toward the passages 24 and 27 to be slung into the combustor 50 from the high rotational speed of the rotor shaft 20.

Figure 3:
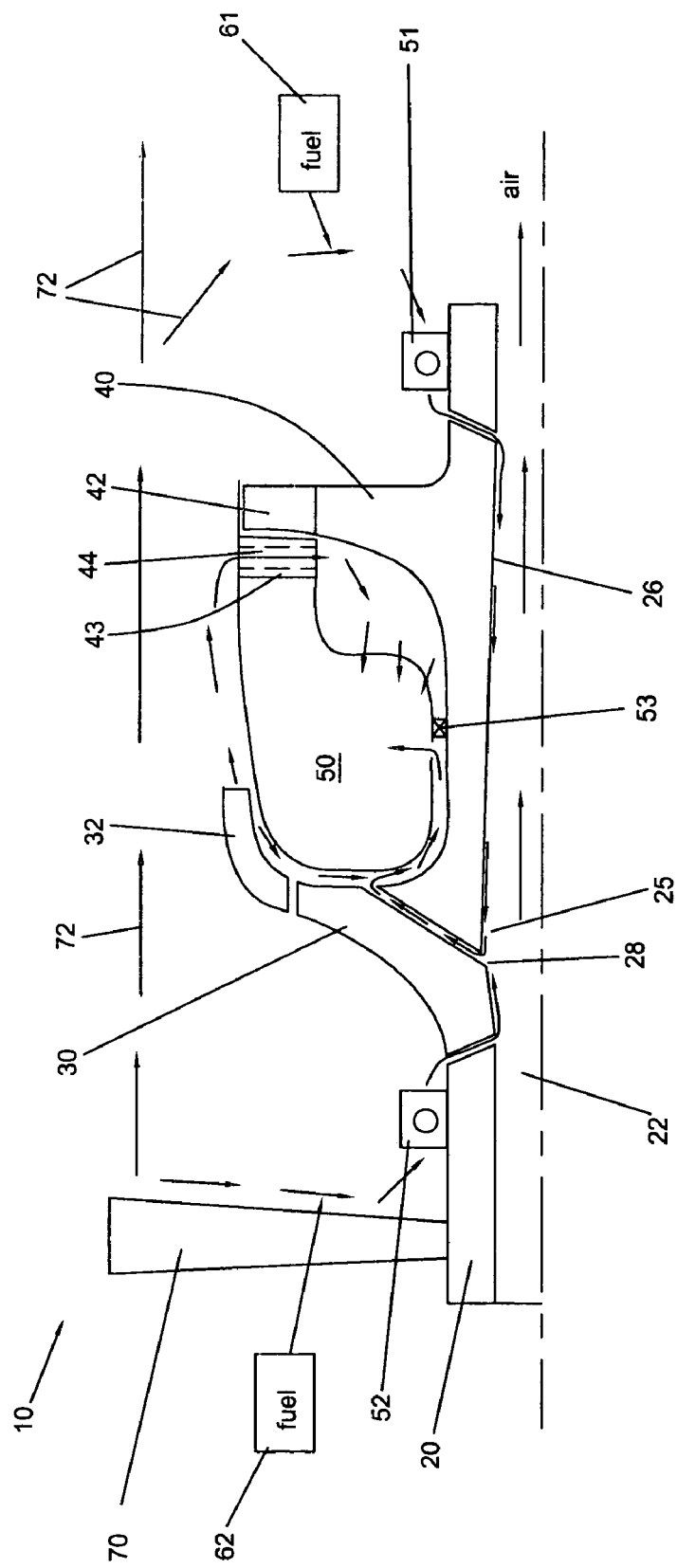
FIG. 3 shows a cross section view of a gas turbine engine in which the fuel slinger is located in the compressor rotor.

An additional embodiment of the gas turbine engine 10 is shown in FIG. 3, in which the slinger passages 24 and 27 of the previous embodiments are replaced with a passage 28 through the compressor 30. The outlet of compressor passage 28 is at a higher radius than the passages 24 and 27 in the rotor shaft 20, and therefore the fuel is raised to a higher pressure before entering the compressed air leading into the combustor 50. The inner surface 25 of the central passage 22 is still slanted to promote the flow of fuel along the inner wall 25 and into the slinger passage 28. A seal member 53 is used to prevent mixing of the compressed air and fuel mixture entering the combustor 50 with compressed air passing through the guide vane 43. the compressed air passing through the guide vane 43 passes into the combustor 50 through a plurality of holes spaced around the combustor 50, and mixes with the compressed air and fuel than enters upstream of the seal.

The operation of the engine of FIG. 3 is the same as the operation of the engine in FIGS. 1 and 2. Compressed air from the diffuser 32 promotes the flow of air through the bearings 51 and 52 and into the passages through the rotor shaft 20 and through the central passage 22. Fuel is injected into the compressed air upstream of the bearings in order to lubricate and cool the bearings. High speed rotation of the shaft 20 promotes a slinging effect of the fuel through the slinger passage 28 and into the compressed air leading into the combustor 50.

Figure 4:
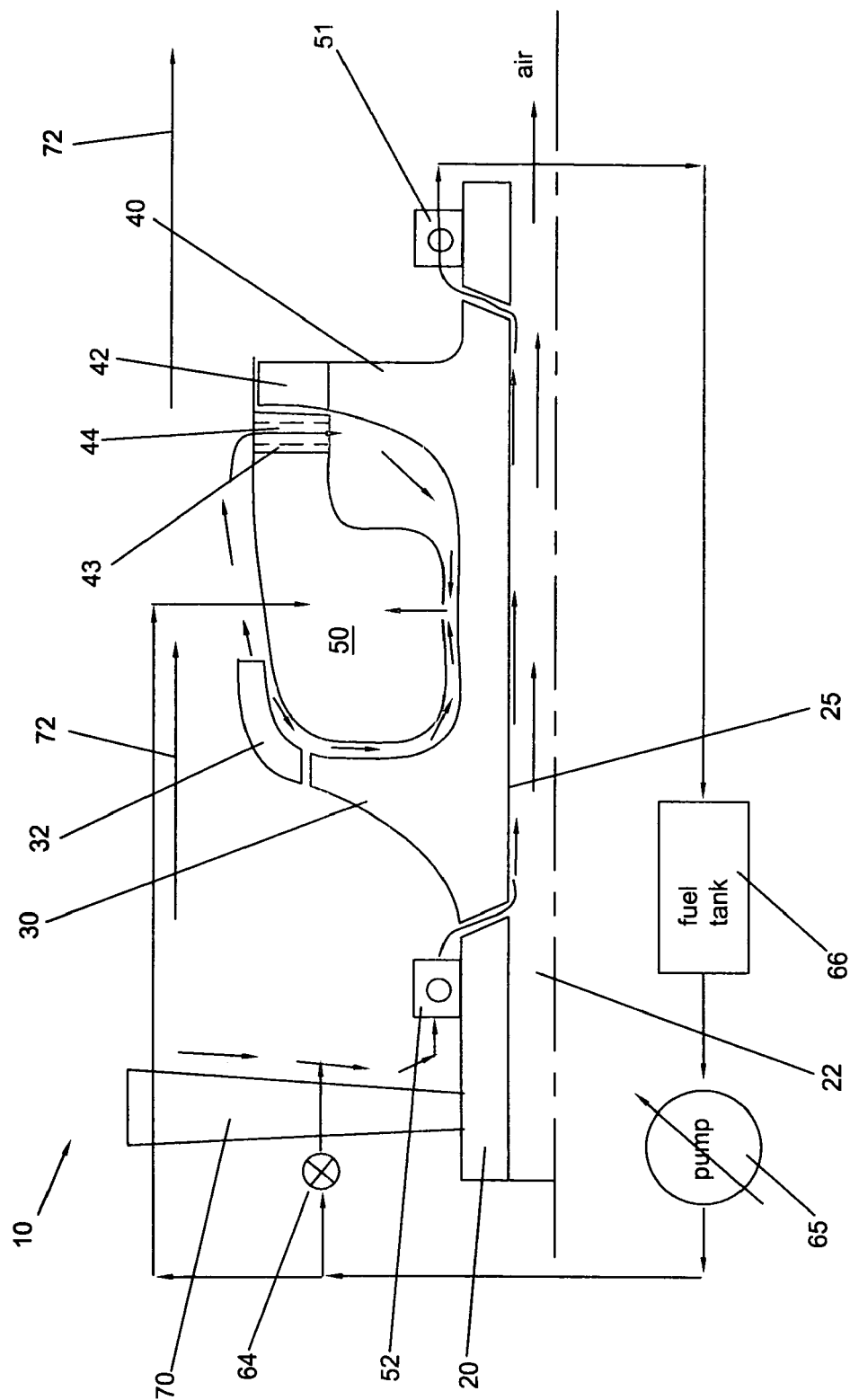
FIG. 4 shows a cross section view of a gas turbine engine with a separate fuel supply for the combustor and the bearing lubrication flow paths.

FIG. 4 shows a different embodiment of the present invention that any of the first three embodiments. Compressed air is delivered to the combustor 50 through upstream and downstream passages around the front portion of the combustor 50 and rear portion of the combustor 50, entering the combustor as in the first embodiment of FIG. 1. However, fuel delivered to the engine in this embodiment (FIG. 4) is delivered into the combustor 50 without premixing with the compressed air. A variable displacement pump 65 is used to regulate a flow of fuel into the engine 10 and through the bearings 51 and 52. A fuel tank 66 contains a reservoir of fuel for delivery to the pump 65. A control valve 64 is used to regulate a supply of fuel into the bearings.

Operation of the engine of FIG. 4 is as follows. Compressed air is delivered into the combustor 50 from the diffuser 32 at an opening on the inner surface of the combustor 50 after the air passes around the upstream portion and downstream portion of the combustor 50. Fuel is delivered into the combustor 50 by the variable displacement pump 65. The regulation of the fuel into the combustor 50 is controlled by regulating the flow from the pump 65.

A control valve 64 is used to deliver fuel from the pump 65 into the central passage 22 through the rotor shaft 20, and through the bearings. Compressed air from the diffuser 32 is diverted into a passage through the upstream bearings 52, where fuel is injected through the control valve 64. Fuel and compressed air is then directed into the central passage 22 and flows toward the downstream bearing 51, where the fuel is delivered into the bearings through a passage in the rotor shaft 20. The compressed air is separated from the fuel due to rotation of the rotor shaft 20. The separated air passing out the rear of the central passage 22 to be mixed with the exhaust gas stream from the turbine 40. Fuel passing through the rear bearing 51 is collected and delivered back into the fuel tank 66. In this FIG. 4 embodiment, the engine power is regulated by varying the flow of fuel from the pump 65 into the combustor, while the flow of fuel through the bearings 51 and 52 is regulated by the control valve 64. The inner wall 27 of the central passage 22 is slanted toward the rear bearings 51 to promote the flow of liquid fuel in that direction.

Regulation of the fuel flow is required to ensure proper lubrication of the bearings. When the engine 10 is operating at high load, enough fuel is used to pass through the bearings and into the combustor to lubricate and cool the bearings. However, during cruising speed, when the fuel flow into the combustor 50 is low, not enough fuel would flow through the bearings. Thus, when the engine 10 operates at cruising speed and fuel flow into the combustor is minimum, fuel flow into the bearings through the control valve 64 can remain high by maintaining the flow through the control valve 64. because the pump outlet pressure is high (about 200 psia), there is enough pressure head in the fuel to allow for the control valve 64 to regulate fuel flow from low flow to high flow rates.

Figure 5:
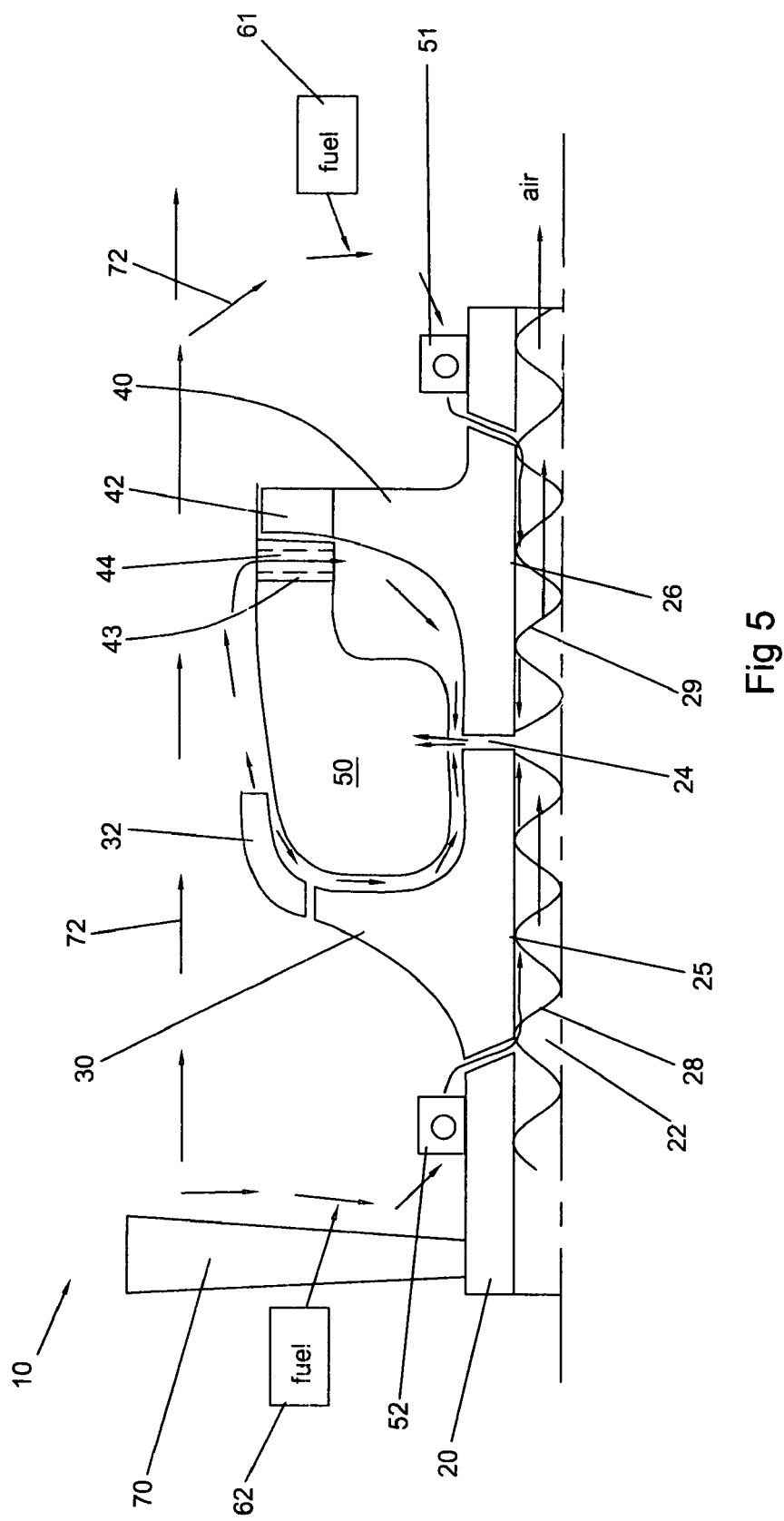
FIG. 5 shows a cross section view of a gas turbine engine with a spiral shaped groove formed on an inner surface of the hollow shaft used to direct liquid fuel along the shaft and into the combustor.

FIG. 5 shows an embodiment of the present invention similar to the engine in FIG. 1. Instead of the inner surface 25 and 26 of the hollow passage 22 being slanted toward the slinger passage 24 for fuel delivery to the combustor 50 of the FIG. 1 embodiment, the FIG. 5 embodiment makes use of spiral channels 28 and 29 formed on the inner surfaces 25 and 26. The hollow passage 22 has a constant diameter. The spiral channels are angled such that rotation of the rotor 20 with force the fuel along the spiral passages toward the slinger passage 24. Spiral passage 28 will move the fuel from forward bearing 52 toward the slinger passage 24 during rotation of the rotor 20, while spiral channel 29 will move fuel from rearward bearing 51 toward the slinger passage 24. The spiral channels 28 and 29 are shown in FIG. 5 with exaggerated angles for description purposes. In the actual engine, because the rotation speed of the rotor is above 100,000 rpms, the spiral channels will be angled more like the grooves found in a gun barrel. The angle of the spiral channels with respect to the longitudinal axis of the rotor will be on the order of a few degrees. As the fuel and air pass through the bearings and into the central passage 22 within the rotor 20, the fuel will form along the inner surfaces 25 and 26 of the central passage 22 and the spiral channels 28 and 29 will move the fuel toward the slinger passage 24 due to rotation of the rotor. The angle of the spiral passages 28 and 29 will depend upon the rotation speed of the rotor and the viscosity of the liquid fuel. Air passing through the central passage 22 will continue to flow out the rear of the rotor 20 as in other embodiments.

A slight variation of the FIG. 5 embodiment is shown in FIG. 6. An additional fuel injection means is used in the FIG. 6 embodiment. A third fuel delivery means 63 is used to inject fuel directly into the combustor 50. The first and second fuel delivery means 61 and 62 as used in the FIG. 5 embodiment are still used to delivery fuel in droplet form to the compressed air from the bypass fan 70 that is directed through the bearings 51 and 52 for lubrication. The fuel that passes through the bearings is also delivered to the combustor through the slinger passage 24. Thus, fuel is delivered into the combustor from the slinger passage 24 and from direct injection into the combustor from the third fuel delivery means 63.

We claim the following:

1. A process for lubricating and cooling a set of bearings in a small gas turbine engine, the engine comprising a compressor and a bypass fan and a forward and a rearward bearing, the process comprising the steps of:

diverting a portion of the bypass fan air through the forward bearing to cool the forward bearing;

diverting a portion of the bypass fan air through the rearward bearing to cool the rearward bearing;

injecting fuel into the forward bearing cooling air upstream from the forward bearing to provide lubrication to the forward bearing;

injecting fuel into the rearward bearing cooling air upstream from the rearward bearing to provide lubrication to the rearward bearing;

collecting the bearing lubricating fuel in the rotating shaft of the engine; and, injecting the bearing lubricating fuel into the combustor to be burned therein; and, separating the fuel from the cooling air within the rotor shaft and discharging the cooling air without being burned with fuel out through an aft end of the rotor shaft.

2. A process for lubricating and cooling a set of bearings in a small gas turbine engine, the engine comprising a compressor and a bypass fan and a forward and a rearward bearing, the process comprising the steps of:

diverting a portion of the bypass fan air through the forward bearing to cool the forward bearing;

diverting a portion of the bypass fan air through the rearward bearing to cool the rearward bearing;

injecting fuel into the forward bearing cooling air upstream from the forward bearing to provide lubrication to the forward bearing;

injecting fuel into the rearward bearing cooling air upstream from the rearward bearing to provide lubrication to the rearward bearing;

collecting the bearing lubricating fuel in the rotating shaft of the engine; and, injecting the bearing lubricating fuel into the combustor to be burned therein; and, passing the cooling air and fuel through the forward bearing in parallel with the cooling air and fuel through the aft bearing.

3. A process for lubricating and cooling a set of bearings in a small gas turbine engine, the engine comprising a compressor and a bypass fan and a forward and a rearward bearing, the process comprising the steps of:

diverting a portion of the bypass fan air through the forward bearing to cool the forward bearing;

diverting a portion of the bypass fan air through the rearward bearing to cool the rearward bearing;

injecting fuel into the forward bearing cooling air upstream from the forward bearing to provide lubrication to the forward bearing;

injecting fuel into the rearward bearing cooling air upstream from the rearward bearing to provide lubrication to the rearward bearing;

collecting the bearing lubricating fuel in the rotating shaft of the engine; and, injecting the bearing lubricating fuel into the combustor to be burned therein; and, collecting the fuel from the two bearings after separating the fuel from the air and discharging the fuel into the combustor chamber.

4. The process for lubricating and cooling a set of bearings in a small gas turbine engine of claim 3, and further comprising the step of:

discharging the fuel from the forward bearing into a forward burn zone of the combustor; and, discharging the fuel from the aft bearing into an aft burn zone of the combustor.

5. A process for lubricating and cooling a bearing in a small gas turbine engine, the engine comprising a compressor and a bypass fan and a bearing supporting a rotor shaft with a central passage, the process comprising the steps of:

diverting a portion of the bypass fan air through the bearing for cooling of the bearing;

injecting fuel into the cooling air passing through the bearing prior to the cooling air passing through the bearing;

collecting the cooling air and the fuel within the central passage of the rotor shaft;

separating the fuel from the cooling air within the central passage;

discharging the fuel from the central passage into a combustion chamber for burning; and, discharging the bearing cooling air out from the central passage within combusting the bearing cooling air.

6. The process for lubricating and cooling a set of bearings in a small gas turbine engine of claim 5, and further comprising the step of:

passing cooling air with fuel through a forward bearing and an aft bearing in a parallel flow path.

\* \* \* \* \*